April 17, 1956

G. P. REINTJES 2,742,023

CIRCULAR FURNACE ROOF

Filed Feb. 16, 1953

INVENTOR
George P. Reintjes
BY Kenneth M. Thorpe

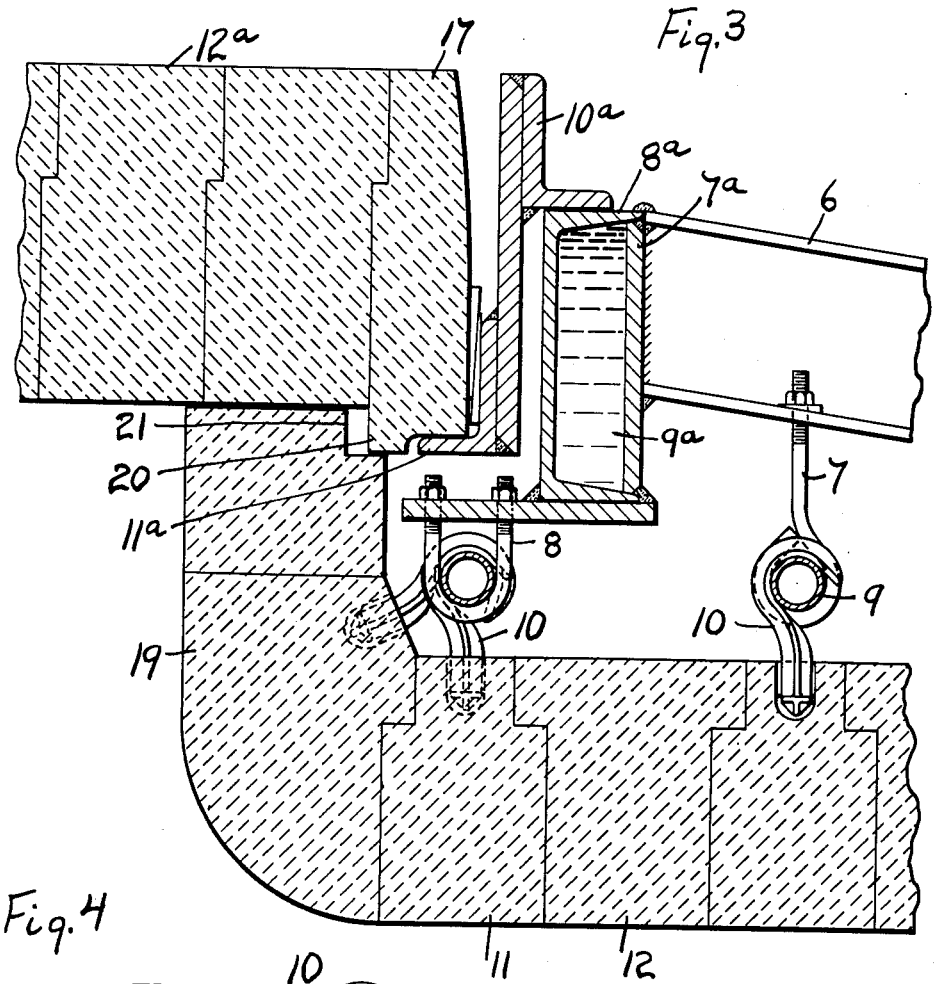
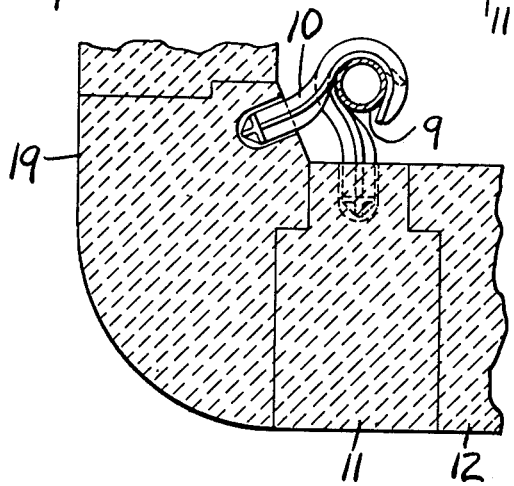

April 17, 1956 G. P. REINTJES 2,742,023
CIRCULAR FURNACE ROOF
Filed Feb. 16, 1953 4 Sheets-Sheet 3

Inventor
George P. Reintjes
By Kenneth M. Thorpe
Attorney

April 17, 1956  G. P. REINTJES  2,742,023
CIRCULAR FURNACE ROOF

Filed Feb. 16, 1953  4 Sheets-Sheet 4

INVENTOR
George P. Reintjes
BY Kenneth M. Thorpe

United States Patent Office 2,742,023
Patented Apr. 17, 1956

2,742,023

CIRCULAR FURNACE ROOF

George P. Reintjes, Kansas City, Mo.

Application February 16, 1953, Serial No. 337,178

6 Claims. (Cl. 122—6)

This invention relates to circular or arcuate laying of tile, refractories or the like, with the minimum of possible shapes. One of the chief objects of the invention is to provide a suspended circular furnace roof preferably of such nature that the roof may be removed and replaced as a unit as in electric furnaces and the like.

Another object of the invention is to provide a furnace roof of multiple or sectionalized character whereby independent or subsidiary roof zones are formed which may be removed or replaced as units without disturbing other parts of the roof. This arrangement is particularly advantageous where certain roof zones are subject to fast deterioration as around electrode openings in electric furnaces or where charging ports are to be provided in a furnace roof.

A further object of the invention is to produce a roof for circular furnaces whereby predetermined rows of tile are suspended from concentric rings of pipe or rod.

Another object of the invention is to provide for the water cooling of the supporting rings of circular furnaces and the like.

With the general objects named in view and others as will hereinafter appear, the invention consists in certain novel and useful features of construction and organization of parts as hereinafter described and claimed; and in order that it may be fully understood, reference is to be had to the accompanying drawings, in which:

Figure 3 is an enlarged fragmental section taken through the inner ring of the roof.

Figure 4 is a modified construction of the center wall for protecting the inner ring and providing a charging opening or for accommodating the electrodes of an electric furnace.

Figure 1:
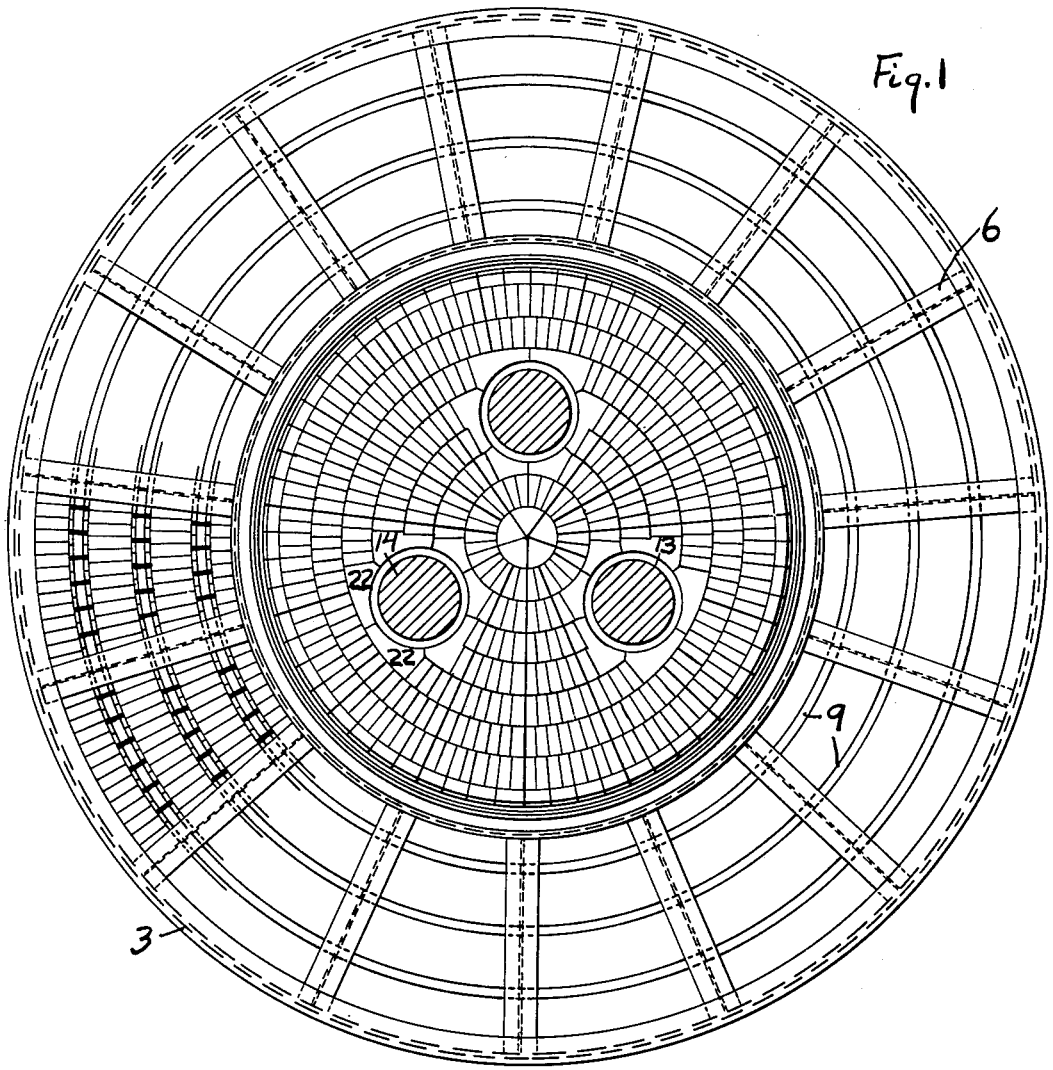
Figure 1 is a top plan view of an electric furnace roof embodying the invention.
Figure 2:
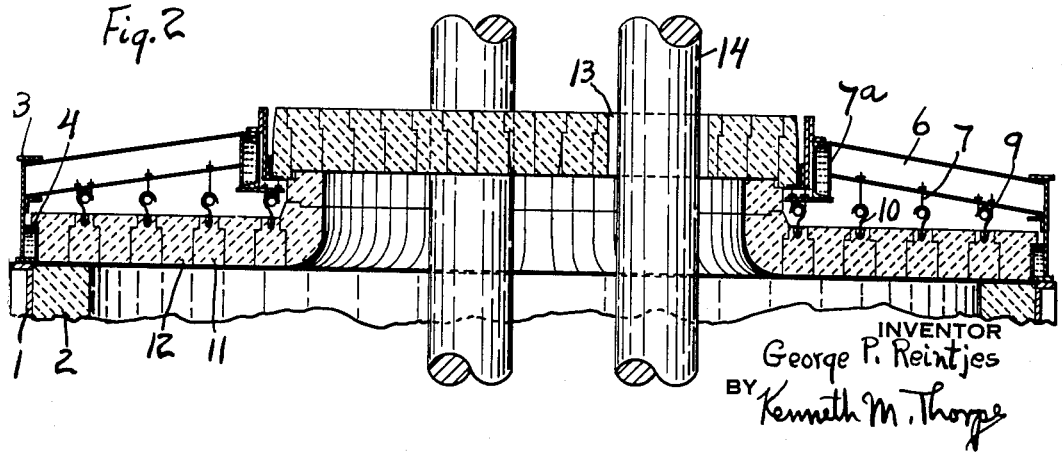
Figure 2 is a cross section through the roof as shown in Figure 1.
Figure 5:
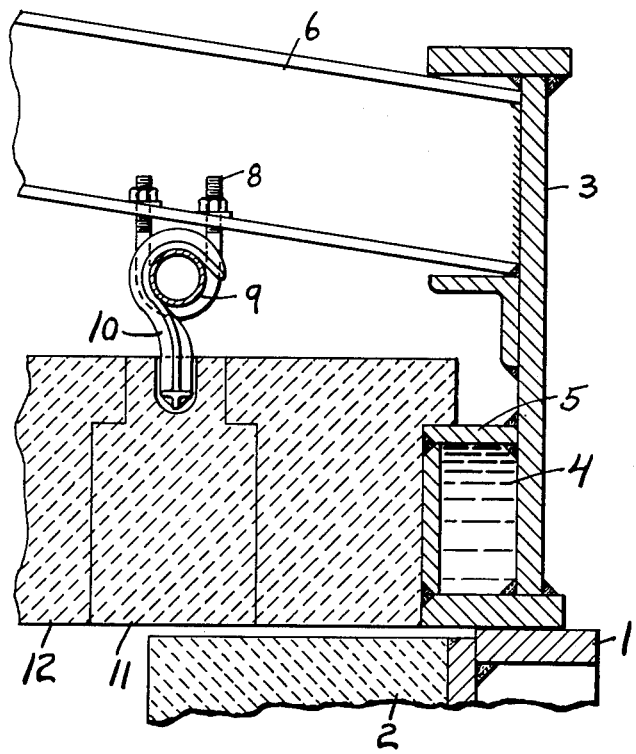
Figure 5 is a section through the outer ring and upper end of a circular furnace.

Referring now to the drawings in detail, 1 is the top edge of a circular furnace framework provided with a refractory lining 2. Adapted to be removably supported by the top of the furnace wall is a metal ring 3, formed with an inwardly projecting flange or shelf 5 which may form part of a water cooling passageway 4.

Figure 8:
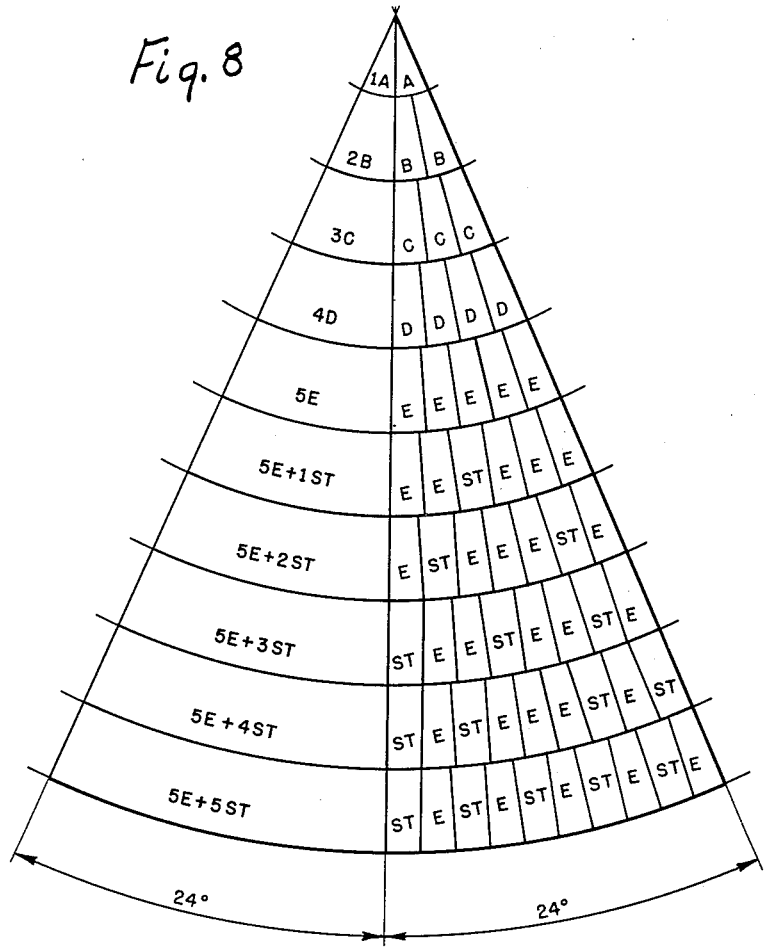
Figure 8 is a diagrammatic view of the lay-out employing rows of tile of uniform length, the outer edge of each tile measuring 3.1416 inches or a multiple thereof.

Extending inwardly from the ring 3 are a series of beams 6, which preferably are in radial relation to the ring and are inclined upwardly as shown. Extending downwardly from the beams 6 are any suitable suspension means which may be eye-bolts 7 or U-bolts 8 which in turn carry concentric rows of arcuate pipes or rods 9. Tile hangers 10 depend from said pipes 9. Tile 11 are carried by the hangers and have their upper corners shouldered by preference, to carry a row of T-shaped filler tile 12 between each row of suspended tile. Concentric rows of tile are thus provided, all of said tile rows being of equal width. To avoid the necessity of innumerable shapes, all tile at their outer edges, may measure substantially 3.1416 inches in width, or are multiples thereof. With this arrangement and measuring outwardly from the center of the furnace in multiples corresponding to the length selected for each tile row, for example, a tile length of 7.5", the first tile A, Figure 8, will have the width of its outer edge substantially equal 3.1416 inches, or any multiple thereof, the tile of the next row B, at their outer edge, will also measure 3.1416 inches, and their width at the inner edge will be 3.1416"/2, etc. as shown in the following table in which the symbol pi is substituted for 3.1416" as a matter of convenience:

| Row | Qty. of tile | Length inner edge | Length outer edge |
|---|---|---|---|
| 1st | 1 | 0 | pi |
| 2nd | 2 | pi/2 | pi |
| 3rd | 3 | 2pi/3 | pi |
| 4th | 4 | 3pi/4 | pi |
| 5th | 5 | 4pi/5 | pi |

Sixth row will comprise five tile duplicating the tile of the 5th row, plus one tile of pi width and parallel sides.

Each succeeding row will duplicate the 6th row, with the addition of one additional straight pi tile per row, i. e., the 7th row will have five tile duplicating the tile of the 5th row, plus two tile of pi width and parallel sides, etc., row for row, each row adding an additional straight tile.

A completely circular furnace of 360°, may thus be considered to be made up of segments equalling 360/dia. 1st row. In the proportions shown in this case, the tile measure 7.5", making the initial diameter 15", and 360/15 equals 24 segments, each of 24° in width.

Figure 7:
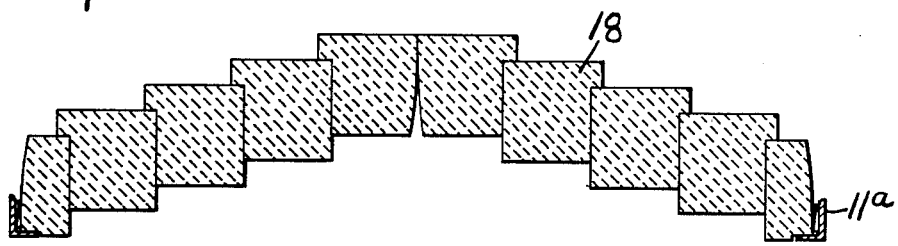
Figure 7 is a section through a stepped subsidiary roof.
Figure 6:
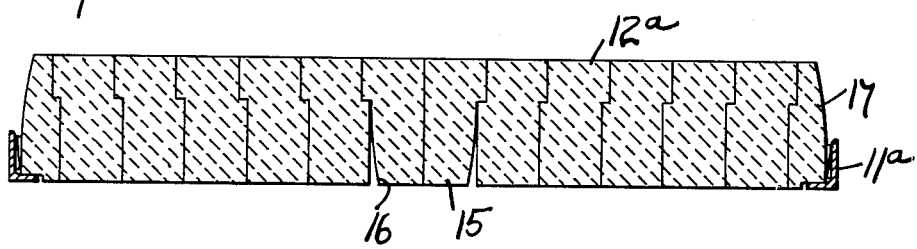
Figure 6 is a cross section through the center section or subsidiary roof supported by the inner ring.

The present roof is shown on an electric furnace for ferrous metals and is equipped with three electrodes, the arc bridging between the two negative and one positive electrode alternately. In this construction the electrodes are ordinarily positioned near the center of the furnace and this area is subject to extreme erosion and spawling, due to thermal shock, the escape of gases around the electrodes, and the fact the furnace roof must stand-up under translation to and from the furnace. The invention, therefore, contemplates sectionalizing the furnace roof to provide it with independently transportable or replaceable subsidiary roofs or sections. In the present embodiment, the supporting beams 6 carry a secondary ring 7a which may be located at any point with reference to the main roof, but is illustrated as positioned concentrically and above the main roof outer ring 3. The ring 7a is also provided with an inner shelf or shoulder 8a which may constitute part of a water cooling chamber 9a, if desired. Adapted to rest on the shoulder 8a is a circular frame 10a which is formed with an angle 11a on which an arch 12a is carried, this being the subsidiary roof. It is shown as having openings 13 to accommodate electrodes 14. Although the subsidiary roof 12a can be a sprung arch, it is preferably relatively flat as shown in Figure 6, the inner ring of tile 15 being relieved at their lower edges as at 16. With this arrangement the pressure line from the lower outer corners of the outer tile row 17 to the inner row 15 will insure that the arch rises on expansion due to heat. Another similar arch arrangement is shown in Figure 7 where each row of tile 18 is stepped upwardly.

The subsidiary roof carried by ring 7a is in a higher plane than that of the main roof, the parts being so made that a circular wall 19 completes the main roof, said wall extending upwardly to such height that it intercepts radiant heat of the furnace and protects the inner ring 7a, when the smaller or subsidiary roof is removed from position. In order to protect the frame 10a from the heat of the furnace, the outer ring of tile 17 is formed with lips 20 projecting below the plane of the flange 11a while the upper course of the wall 19 is notched as at 21 to protect the lip 20 when the subsidiary roof is in place. Each of the openings around the electrodes is circumscribed by a series of squaring tile 22 having their outer edges in line with the concentric tile rows multiples of pi so that they may be conveniently and snugly fitted in the subsidiary roof.

From the above description and drawings it will be apparent that I have produced a construction embodying all of the features of advantage set forth as desirable, and while I have described and illustrated the preferred embodiment, it is to be understood that I reserve the right to all changes within the spirit and scope of the appended claims.

I claim:

1. In a circular furnace roof, a ring support, a second ring within the first ring, beams cantilevered from the first ring and supporting the second ring, roof tile suspended from the beams and filling the space between the first and second rings, and a subsidiary roof removably supported by the inner ring.

2. In a circular furnace roof, a ring support, a second ring concentrical to the first ring, beams cantilevered from the first ring and supporting the second ring, roof tile suspended from the beams and filling the space between the first and second rings, and a subsidiary roof removably carried by the inner ring.

3. In a circular furnace having an open upper end, a ring supported by the furnace and concentric with the open upper end thereof, a series of beams carried by the ring and extending inwardly in spaced relation, a second ring supported by the beams concentric to the first ring, and abutting tile rows filling the area within the second ring and the space between the pairs of rings, and filler blocks inserted between the inner ring and the first tile row, all of said tile being of uniform length.

4. In a circular furnace having an open upper end, a ring supported by and concentric with the upper end of the furnace, a series of beams carried by the ring and extending inwardly in spaced relation, a second ring carried by the beams concentric to the first ring, a circular frame removably carried by the second ring, tile filling the space between the first and second rings, a row of filler block lining the frame, and concentric rows of tile filling the space within the filler block row.

5. In a circular furnace having an open upper end, a ring carried by and concentric with the upper end of the furnace, beams extending inwardly from the ring, arcuate pipe sections suspended from the beams in concentric rows of uniform width, rows of abutting tile suspended from the pipe, a ring supported by the inner ends of said beams and spaced above the tile, a circular wall of tile extending upwardly from the roof tile to protect the inner ring against radiation from the furnace, a removable circular frame supported by the inner ring, and tile filling said circular frame.

6. In a circular furnace roof, a ring support, a second ring within the first ring, beams cantilevered from the first ring and supporting the second ring, each of said rings being water cooled, roof tile suspended from the beams and filling the space between the first and second rings, and a subsidiary roof removably supported by the inner ring.

References Cited in the file of this patent

UNITED STATES PATENTS

| 1,274,034 | Griffin | July 30, 1918 |
| 1,524,033 | Hawke | Jan. 27, 1925 |
| 1,541,486 | Dobie | June 9, 1925 |
| 1,769,894 | Wonning | July 1, 1930 |
| 2,021,424 | McPherson | Nov. 19, 1935 |
| 2,274,240 | Ladd | Feb. 24, 1942 |
| 2,659,327 | Honig | Nov. 17, 1953 |

FOREIGN PATENTS

| 852,963 | France | Nov. 9, 1939 |
| 1,016,560 | France | Aug. 27, 1952 |